R. VARLEY.
BATTERY PROTECTING DEVICE FOR CHARGING AND LIGHTING SYSTEMS.
APPLICATION FILED NOV. 29, 1919.
1,361,651.  Patented Dec. 7, 1920.
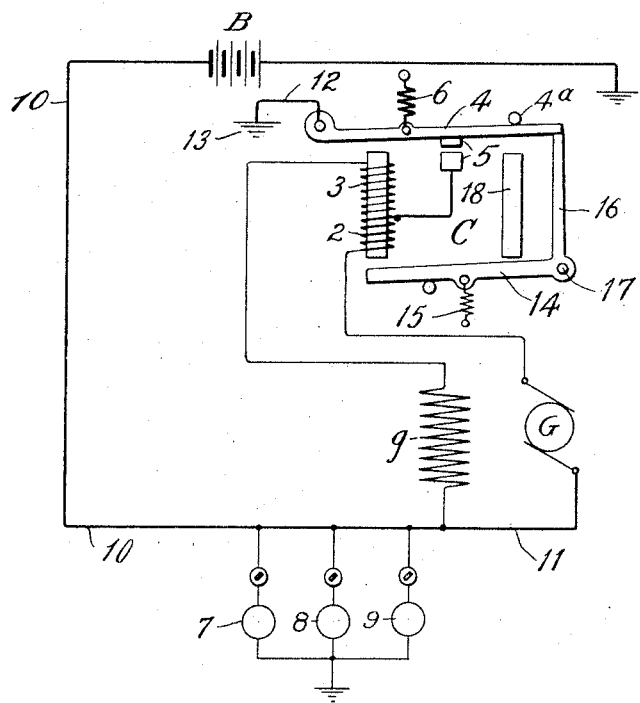

UNITED STATES PATENT OFFICE.

RICHARD VARLEY, OF ENGLEWOOD, NEW JERSEY, ASSIGNOR TO VARLEY DUPLEX MAGNET COMPANY, A CORPORATION OF NEW JERSEY.

BATTERY-PROTECTING DEVICE FOR CHARGING AND LIGHTING SYSTEMS.

1,361,651.    Specification of Letters Patent.    Patented Dec. 7, 1920.

Application filed November 29, 1919. Serial No. 341,503.

*To all whom it may concern:*

Be it known that I, RICHARD VARLEY, a citizen of the United States, residing at Englewood, in the county of Bergen and State of New Jersey, have invented certain new and useful Improvements in Battery-Protecting Devices for Charging and Lighting Systems, of which the following is a full, clear, and exact description.

This invention relates to battery lighting and charging systems, the general object being the correction of a faulty action which sometimes occurs in the operation of a well known type of such systems. In a system comprising a battery, a charging dynamo and an automatic controlling switch, when the dynamo is not charging the battery it sometimes occurs that the contacts of the switch become accidentally or carelessly closed momentarily, thereby permitting the battery current to energize the switch and continuously hold the battery circuit closed through the contacts, which results in a virtual short circuit and consequent exhaustion of the battery. To avoid this my invention contemplates the provision of means for automatically incapacitating the contacts of the controlling switch either by positively locking them in open position while the dynamo is not charging or by opening the circuit at some other point so that if the contact should become closed accidentally or otherwise, they will convey no current during the periods when the dynamo is idle.

To more fully explain my invention reference will be made to the accompanying drawing which is a conventional representation of the apparatus and circuits of a battery lighting and charging system for automobiles showing my improvement interposed therein.

Referring to the drawing, G represents an electric generating machine or dynamo, B a storage battery adapted to be charged by said machine and C an automatic controlling switch adapted to switch the current from the generator to the battery when the electro-motive force has risen to the predetermined point suitable for charging. The controlling switch comprises a magnetic core 1, two coils 2 and 3 usually of unequal number of turns and an armature 4 controlling a pair of contacts 5. The coils 2 and 3 are connected in series and one of the contacts 5 is connected with the circuit between the two coils, the other contact 5 being carried by the armature. The contacts are normally held open by a spring 6. $g$ is the shunt field coil of the dynamo, and 7, 8, and 9 indicate lamps with their switches adapted to be supplied with current by the battery or generator. The operation of this portion of the system is as follows: When the battery alone is supplying the lights, the current flows from the battery through the wire 10, and the lamps 7, 8 and 9 to the ground, and from the ground back to battery. If the dynamo G is running at the same time at a rate below its charging rate, its circuit will be directly through coils 2 and 3, field coil $g$ and wire 11. If the generator is running at a charging speed the magnetism of the core 1 of the controlling switch will be sufficient to draw the armature 4 downward and close the contacts 5, thus establishing a circuit from the generator through the coil 2, contacts 5, armature 4 and to ground by wire 12. From ground the current divides between the lamps and the battery and returns by wire 11 to the generator. If the lamps are not in operation the entire current from the generator will pass from ground 13 through the battery and by wires 10 and 11 back to the generator. When the car stops, or the generator for any reason is not driven, the armature 4 of the controlling switch is normally drawn against its back stop 4ª by the spring 6 and the contacts are held open. In this system as described it has been found that occasionally, by accident or carelessness, the armature 4 is forced downward momentarily until the contacts 5 are brought together. This may be caused by an unusual shock or bump given to the car when standing, or a workman may touch the armature and push the contacts together. When this occurs it will be seen that a virtual short circuit is established from the battery through wires 10, the armature of G, coil 2, contacts 5, armature 4 to the ground and battery since the resistance of the armature when not in motion is very low, owing to the absence of a counter-electro-motive force. The circuit traced is therefore held closed continuously, owing to the magnetic pull on the armature of the coil 2. The battery because of this very low resistance in the external circuit rapidly loses its charge and thereafter cannot be used for vehicle starting purposes until recharged. Rapid discharge of a storage battery in this manner is very likely to seriously damage its plates. A small amount of current also passes through a shunt circuit including the field $g$ and coil 3, but as the resistance of this branch is very high, no great harm results therefrom.

My improvements are designed to overcome this difficulty and for this purpose an additional armature 14 is provided for coöperation with the lower end of the core 1. The armature 14 is normally retracted by a spring 15 somewhat weaker than the spring 6 which retracts the armature 4 and is provided with an arm 16 which extends at an angle to the armature and forms therewith a bell crank lever pivoted at 17. The extremity of the arm 16 is normally beneath the armature 4 and locks or latches the latter in its retracted position where the contacts 5 are separated. It will now be seen, that when the voltage of the dynamo rises to the charging point the two armatures 4 and 14 will be attracted, the latter operating slightly before the former because of its weaker retractile spring and swinging to a position to carry the arm 16 out of engagement with armature 4 whereupon armature 4 responds and closes the circuit at contacts 5 to establish the charging connection. When the dynamo ceases to generate, both armatures are released, armature 4 responding a little ahead of armature 14 and going to its back stop where it is immediately locked by the arm 16. In this condition it will be seen that accidental touching of the armature 4 cannot bring the contacts 5 into engagement nor can any jarring which may be delivered to the armature cause its contacts to function. The contacts 5 are therefore incapacitated, being unable to convey current while the car is not in use or the generator not running or at a charging speed; hence it is impossible for the battery to be short circuited from the causes above pointed out. To increase the efficiency of the magnetic circuit, I may provide a core 18 disposed similarly to core 1 between the armatures 4 and 14, and the arm 16 will preferably be formed of a non-magnetic material.

I claim:

1. The combination of an electric generating machine, a storage battery adapted to be charged thereby, an armature, resilient means for yieldingly holding the armature in one position, electro-magnetic means connected to said generator and adapted to shift said armature to another position against the action of the resilient means when the voltage of the generator has reached a predetermined value, contact means controlled by the armature when in the second mentioned position for connecting the battery and generator, and when in the first mentioned position for disconnecting the battery and generator and locking means controlled by the electro-magnetic means for preventing accidental movement of the armature away from the first mentioned position.

2. The combination of an electric generating machine, a storage battery adapted to be charged thereby, an armature, resilient means for yieldingly holding the armature in one position, electro-magnetic means connected to said generator and adapted to shift said armature to another position against the action of the resilient means when the voltage of the generator has reached a predetermined value, contact means controlled by the armature when in the second mentioned position for connecting the battery and generator, and when in the first mentioned position for disconnecting the battery and generator, and locking means controlled by the electromagnetic means operative, when the voltage of the generator is below said predetermined value, to lock the armature against movement to its second mentioned position.

3. The combination of a shunt wound generating machine, a storage battery to be charged thereby, a device including a coil connected in series with the field for connecting the generator and battery when the voltage in the generator equals or exceeds a certain value, and means controlled by the said coil for preventing operation of said device to connect the generator and battery when the voltage of the generator is below a certain value.

4. The combination of a shunt wound generator, a storage battery to be charged thereby, a magnetic coil connected in series with the field, an armature responsive to said coil when the generator is operating at a charging rate, a charging circuit closed by the armature when responsive to the coil, and means controlled by the coil for preventing closing of the charging circuit by the armature when the generator is idle.

5. The combination of a shunt wound generator, a storage battery to be charged thereby, a magnetic coil connected in series with the field, an armature responsive to said coil when the generator is operating at a charging rate, a charging circuit closed by the armature when responsive to the coil, a second armature controlled by said coil for locking the first mentioned armature against a circuit closing movement when the generator is idle.

6. The combination of an electric generating machine, a storage battery adapted to be charged thereby, two circuits both of which include the battery and one including the generating machine, a pair of contacts through which both circuits lead, a latch adapted to lock the contacts in open position and means whereby current from the generating machine will release said latch.

7. The combination of an electric generating machine, a storage battery adapted to be charged thereby, an electro-magnetic circuit controller provided with an armature controlling a pair of contacts and another armature carrying a latch for holding the first armature in open circuit position and two circuits both including said contacts, one of said circuits carrying the charging current and the other being a shunt circuit of the battery, and a circuit including the generating machine for energizing the circuit controller.

In witness whereof I hereunto subscribe my signature.

RICHARD VARLEY.